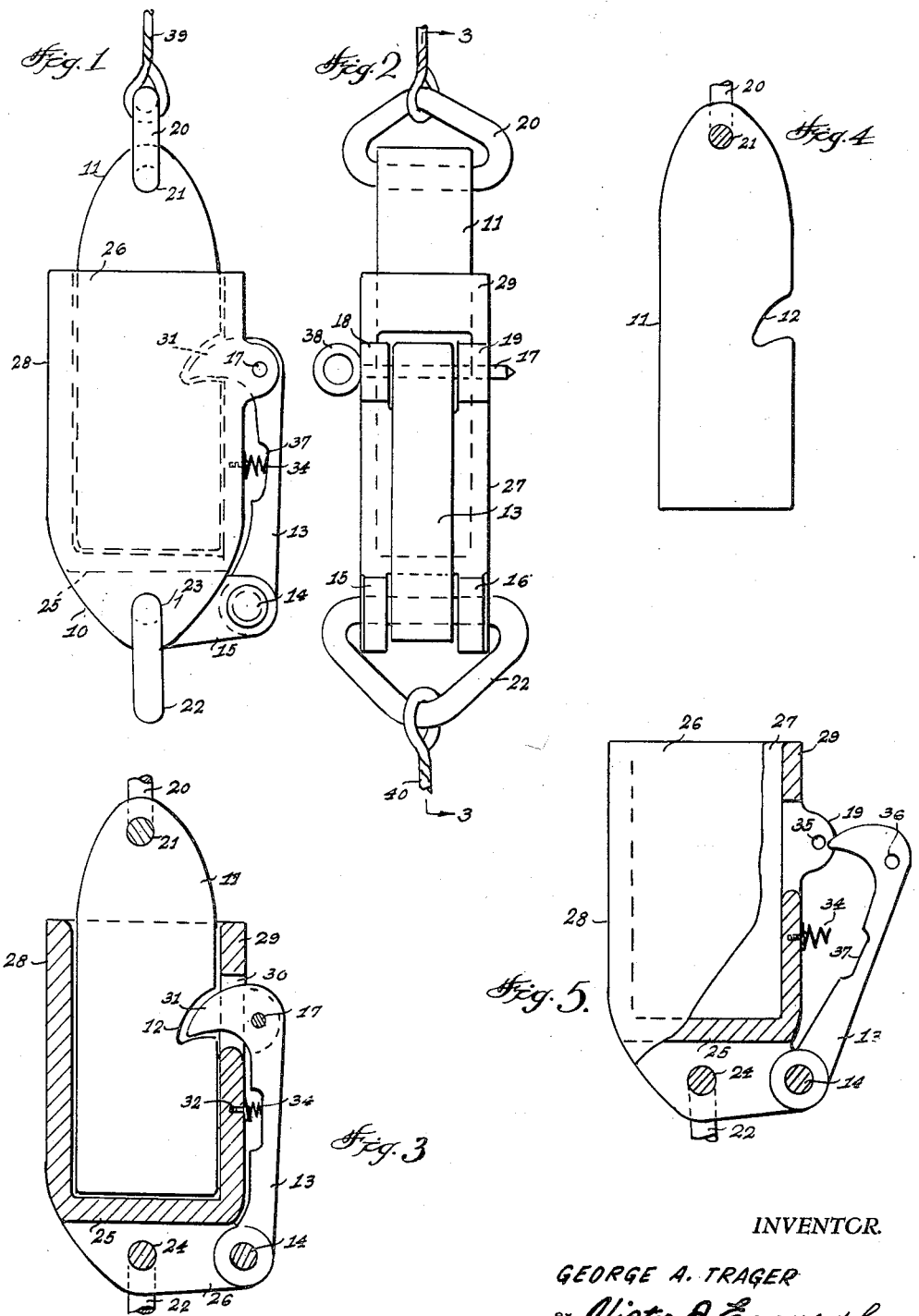

United States Patent Office

2,931,088
Patented Apr. 5, 1960

2,931,088

PARACHUTE RELEASE CLEVIS

George A. Trager, Los Angeles, Calif.

Application May 6, 1958, Serial No. 733,295

2 Claims. (Cl. 24—230)

This invention relates to landing gear of parachutes, and in particular includes a substantially U-shaped case having a hook or trigger pivotally mounted by a safety pin thereon, and a plug having a notch in one side designed to be retained in the case by the hook until the safety pin is withdrawn, and in which rings are provided in the case and plug for attaching a parachute to the plug and the harness of a paratrooper to the case.

The purpose of this invention is to provide means for instantly releasing a parachute from the harness of a paratrooper to prevent injury to the paratrooper resulting from being dragged over the ground in landing.

Because it is desirable to positively connect a parachute to a paratrooper connections between a parachute and the harness is of such design that the parts are not readily separated and for this reason it is necessary for the paratrooper to draw in the parachute as rapidly as possible in order to prevent bodily injury. With this thought in mind this invention contemplates a clevis for connecting a parachute to a harness of a paratrooper in which a hook pivotally mounted by a safety pin on the harness portion of the connection extends into a notch in a plug of the parachute gear whereby the plug is permanently secured in the connection from the harness until manually released.

The object of this invention is, therefore, to provide means for connecting a parachute to a harness of a paratrooper whereby the paratrooper may readily release the parachute.

Another object of the invention is to provide a device for connecting a parachute to a harness of a paratrooper in which the parachute may be released from the harness by withdrawing a pin extended through connecting elements of the parachute gear.

A further object of the invention is to provide a clevis for connecting a parachute to the harness of a paratrooper so that the parachute may be readily released in which the clevis is of a simple and economical construction.

With these and other objects and advantages in view the invention embodies a substantially U-shaped case open at one end and having a ring or loop pivotally mounted in the opposite end, a plug having a ring extended through the end thereof and having a notch in one side freely positioned in the case, a hook pivotally mounted on the case and having a prong extended into the notch of the plug, a safety pin extended through ears of the case and the head of the hook for retaining the hook in the notch of the plug, and a spring for snapping the prong of the hook from the notch of the plug when the safety pin is withdrawn.

Other features and advantages of the invention will appear from the following description taken in connection with the drawing, wherein:

Figure 1 is a side elevational view showing the improved clevis for attaching a parachute to the harness of a paratrooper.

Figure 2 is an edge elevational view of the clevis shown in Figure 1.

Figure 3 is a longitudinal section through the clevis taken on line 3—3 of Figure 2 showing the plug locked in the case by the prong of the hook.

Figure 4 is a side elevational view of the plug secured in the case of the clevis showing a hook or prong receiving notch in one side of the plug.

Figure 5 is a side elevational view of the case of the clevis with parts broken away illustrating the mounting of the hook and showing the hook in the released position in which the safety pin is withdrawn.

Referring now to the drawing wherein like reference characters denote corresponding parts the parachute release clevis of this invention includes a substantially U-shaped case 10, a plug 11 designed to be freely mounted in the case and having an arcuate notch 12 in one side, a hook 13 pivotally mounted by pin 14 in spaced flanges 15 and 16 at the lower end of the case and temporarily held by a safety pin 17 extended through ears 18 and 19 on the upper part of the case, a ring or loop 20 extended through an opening 21 in the upper end of the plug and a ring or loop 22 extended through openings 23 and 24 in the flanges 15 and 16, respectively.

The case 10 of the clevis is provided with a base 25 with side walls 26 and 27 and end walls 28 and 29 extended upwardly from the base and, as shown in Figures 2 and 3 the flanges 15 and 16 extend downwardly from the lower edges of the side walls 26 and 27. The ears 18 and 19 extend from edges of the side walls and project outwardly from the end wall 29 and as, illustrated in Figure 3, the end wall 29 is provided with an opening 30 through which a prong 31 on the upper end of the hook 13 extends. With the plug 11 in the case the notch 12 is in registering relation with the opening 30 whereby the prong 31 extends through the opening 30 and into the notch, as illustrated in Figure 3.

The end wall 29 is also provided with a threaded socket 32 in which a screw 33 is positioned and the screw retains the inner end of a spring 34 in position upon the end wall 29 wherein as the hook 13 is pressed inwardly to place the pin 17 through openings 35 in the ends 18 and 19 and an opening 36 in the hook the spring 34 is compressed so that as soon as the pin is withdrawn from the openings 35 and 36 the spring 34 snaps the hook outwardly to the position illustrated in Figure 5. The inner surface of the hook 13 is provided with a recess 37 into which the outer end of the spring 34 is positioned with the hook in the position of locking the plug in the case, as shown in Figure 1.

The safety pin 17 is provided with a finger loop 38 on one end whereby a finger of a paratrooper may be extended through the loop 38 so that the paratrooper may withdraw the pin, releasing the parachute from the harness as he approaches the ground.

*Operation*

In use a cord or cable 39 connects the loop 20 at the upper end of the clevis to a parachute and a similar cord or cable 40 which is attached to the loop 22 at the opposite end of the clevis extends for connection to the harness of a paratrooper and with the plug 11 snapped in the case, as shown in Figures 1 and 3, the parachute cord may remain intact whereby a paratrooper may be suspended from a parachute with safety.

As the device approaches the ground the safety pin 17 is withdrawn by the paratrooper and the spring 34 snaps the hook 13 outwardly to the position shown in Figure 5 wherein the prong 31 moves outwardly from the notch 12 permitting the plug to pass out of the socket or case so that the parachute is released from the paratrooper and the paratrooper may land on the ground or as desired.

It will be understood that modifications, within the scope of the appended claims, may be made in the design and arrangement of the parts without departing from the spirit of the invention.

What is claimed is:

1. In a releasing parachute clevis, the combination which comprises a substantially U-shaped case having a base with side and end walls and one of said end walls having an opening therethrough, a loop extended through flanges extended from the side walls of the case, a hook pivotally mounted between the flanges extended from the side walls of the case and positioned to extend through the opening in the end wall of the case, the sidewalls having ears positioned on opposite sides of the hook, each of said ears and said hook having openings therein that are adapted to be alined with each other, a quick detachable safety pin extended through the aligned opening in the hook and the aligned openings in the ears, and a plug having a notch in one side positioned in the case and located whereby the notch is in registering relation with the opening in the end wall of the case whereby a portion of the hook extends through the opening in the end wall and into the notch of the plug with the parts in locking positions.

2. In a clevis for connecting a parachute to a body harness, the combination which comprises a substantially U-shaped case having a base with an end wall provided with an opening therein and side walls having flanges extended from the lower ends thereof, a loop pivotally mounted in the flanges at the lower ends of the side walls of the case, a plug having a notch in one side freely mounted in the case and having a line attaching loop pivotally mounted in one end thereof, the notch in the side of the plug being in registering relation with the opening in the end wall of the case, a hook pivotally mounted in the flanges extended from the lower ends of the side walls of the case and having a prong extended through the opening in the end wall of the case and into the notch of the plug, and a spring mounted on the end wall of the case in which the opening is positioned and designed to engage the inner edge of the hook with the hook in the locking position whereby the prong thereof extends through the opening in the end wall of the case and into the notch of the plug, the sidewalls having ears positioned on opposite sides of the hook, each of said ears and said hook having openings therein that are adapted to be alined with each other, a safety pin extended through the openings in said ears, ears on the sides of the case and also through the hook, and said spring adapted to urge the prong outwardly of the opening in the end wall when said pin is moved outwardly of the alined openings in said ears and said hook.

References Cited in the file of this patent

UNITED STATES PATENTS

| 387,664 | Teahles | Aug. 14, 1888 |
| 408,308 | Keller | Aug. 6, 1889 |
| 1,721,356 | Schulz | July 16, 1929 |

FOREIGN PATENTS

| 463,173 | Italy | Apr. 18, 1951 |